US012686599B2

(12) United States Patent
Neubert et al.

(10) Patent No.: US 12,686,599 B2
(45) Date of Patent: Jul. 21, 2026

(54) LIFTING GEAR, AND METHOD FOR ADJUSTING THE BOOM OF SUCH A LIFTING GEAR

(71) Applicant: Liebherr-Werk Biberach GmbH, Biberach an der Riss (DE)

(72) Inventors: Thomas Neubert, Bahra (DE); Dirk Wehner, Dresden (DE); Julian Hafner, Äpfingen (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 459 days.

(21) Appl. No.: 18/265,666

(22) PCT Filed: Dec. 9, 2021

(86) PCT No.: PCT/EP2021/085020

§ 371 (c)(1),
(2) Date: Jun. 6, 2023

(87) PCT Pub. No.: WO2022/122934

PCT Pub. Date: Jun. 16, 2022

(65) Prior Publication Data

US 2024/0043250 A1 Feb. 8, 2024

(30) Foreign Application Priority Data

Dec. 9, 2020 (DE) ..................... 10 2020 132 850.8

(51) Int. Cl.

| | |
|---|---|
| ***B66C 23/00*** | (2006.01) |
| ***B66C 23/70*** | (2006.01) |
| ***B66C 23/82*** | (2006.01) |

(52) U.S. Cl.
CPC ............ *B66C 23/54* (2013.01); *B66C 23/705* (2013.01); *B66C 23/821* (2013.01)

(58) Field of Classification Search
CPC ...................................................... B66C 23/54
See application file for complete search history.

(56) References Cited

U.S. PATENT DOCUMENTS 4,801,126 A * 1/1989 Rosman .................. B66C 13/18 254/386
6,481,202 B1 * 11/2002 Zuehlke .................. B66C 23/82 91/461

(Continued)

FOREIGN PATENT DOCUMENTS

DE 967 531 B 11/1957
DE 11 29 268 A 5/1962

(Continued)

OTHER PUBLICATIONS

Search Report from German Application No. 10 2020 132 850.8 dated Apr. 3, 2021.

(Continued)

*Primary Examiner* — Thomas E Lazo
(74) *Attorney, Agent, or Firm* — TROUTMAN PEPPER LOCKE LLP; Ryan A. Schneider; Nicholas H. Doss

(57) ABSTRACT

A lifting gear, in particular a telescopic boom crane, including at least one boom, a boom adjustment unit including at least one hydraulic actuator for adjusting the boom, and a control device for controlling the movement of the hydraulic actuator, the control device being provided with a displacement controller having at least one pump for adjusting the hydraulic actuator.

16 Claims, 3 Drawing Sheets

(56) References Cited

U.S. PATENT DOCUMENTS

Figure 1:
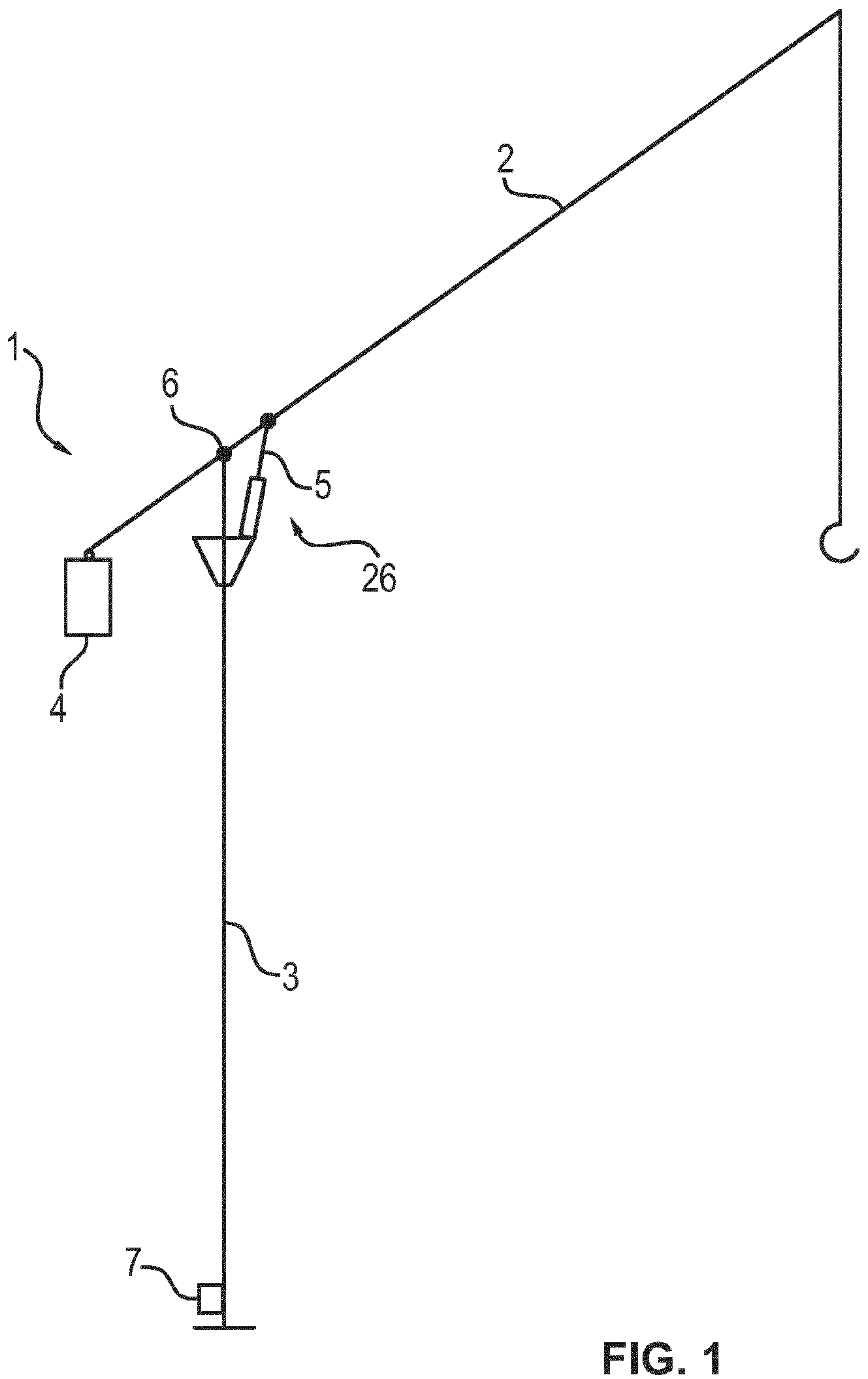

| | | | | |
|---|---|---|---|---|
| 2004/0069375 | A1 | 4/2004 | Kurelek et al. | |
| 2011/0030364 | A1* | 2/2011 | Persson | F15B 21/08 60/486 |

FOREIGN PATENT DOCUMENTS

| | | | | |
|---|---|---|---|---|
| DE | 102011005337 | A1 | | 9/2012 |
| EP | 2824334 | A1 | | 1/2015 |
| JP | 2000025957 | A | * | 1/2000 |
| JP | 2001011889 | A | | 1/2001 |
| WO | 2009102740 | A2 | | 8/2009 |

OTHER PUBLICATIONS

International Search Report and Written Opinion from Application No. PCT/EP2021/085020 dated Apr. 8, 2022.

Voslanger, Martin, https://de.community.boschrexroth.com/t5/blogs/blogarticleprintpate/blog-id/rexde_community-blog/article-id/26 [retrieved am Oct. 26, 2021].

* cited by examiner

LIFTING GEAR, AND METHOD FOR ADJUSTING THE BOOM OF SUCH A LIFTING GEAR

The present invention relates to a lifting gear, in particular in the form of a telescopic boom crane, having at least one boom, a boom adjustment unit comprising at least one hydraulic actuator for adjusting the boom, and a control device for controlling the movement of the hydraulic actuator. The invention also relates to a method for adjusting the boom of a lifting gear by means of a hydraulic actuator.

In various lifting gears, the boom, from which a hoisting cable with a load handling means attached thereto can run off, for example in the form of a load hook, can be adjusted by means of one or more hydraulic actuators in order to move the load handling means to the desired location or also to adapt the boom to the respective lifting task. In particular, in the case of tower revolving cranes with a luffing boom, for example, which are sometimes casually referred to as luffers, the boom can be luffed up and down by means of one or more hydraulic cylinders in order to maneuver a picked-up load closer to or further away from the tower or simply to minimize the outreach of the crane, for example in order to be able to turn the crane in a narrow urban canyon or also to perform lifting work and raise or lower a load. However, mobile cranes or telescopic cranes also have booms that can be luffed up and down by means of a hydraulic actuator. In case of such telescopic boom cranes, the boom can also be retracted and extended by means of one or more hydraulic cylinders or other hydraulic actuators.

The hydraulic control of the adjustment of such booms usually takes place at least during lowering or retracting with the aid of brake valves or throttle valves, via which the pressure fluid flowing out and/or in at the hydraulic actuator is controlled with regard to the flow quantity and/or flow rate. In this respect, fitting a lowering brake valve or throttle valve to each of the two ports of a hydraulic cylinder belongs to the customary practice.

The valves are controlled as a function of pressure, in particular by the opposite side in each case. Such a pressure-controlled valve system, however, is typically prone to vibration, and to reduce vibrations, the system is usually heavily damped via hydraulic orifices. This in turn, however, adversely affects controllability by the operator, as the system responds sluggishly. At the same time, quite high energetic losses occur at the damping orifices or at the control edge.

It is therefore the underlying object of the present invention to provide an improved lifting gear as well as an improved method for adjusting the boom of such a lifting gear, which avoid the disadvantages of the prior art and further develop the latter in an advantageous manner. In particular, it is intended to provide precise, sensitive and fast-response control of the adjusting motion of the boom without the risk of vibration in an energy-efficient manner.

The task is solved, according to the invention, with a lifting gear as claimed in claim 1 and a method for controlling such a lifting gear. Preferred embodiments of the invention are the subject-matter of the dependent claims.

It is thus proposed to adjust the boom by means of a displacement controller and to control the volume displacement provided for this purpose by means of at least one pump. According to the invention, the control device for controlling the boom adjustment comprises a displacement controller with at least one pump for adjusting the hydraulic actuator. Such a displacement controller not only enables fast response and precise control of boom movement according to the specifications of the operator, but also reduces the pressure load on the hydraulic actuator in regard to the conventional brake valve controls, in particular when by the operator there are specified fast direction changes. At the same time, the system is characterized by increased energy efficiency.

Advantageously, the boom adjustment unit is motion-controlled without throttle valves, in particular without lowering brake valves, as a result of which the losses typical of throttle valves can be avoided, which occur with the throttle valves due to the conversion of the pressure energy and flow energy into heat energy and can accordingly not be used, resulting in poorer energy efficiency and increased cooling capacity. The hydraulic control device can be designed free of throttle and lowering brake valves and accomplish the motion control of the boom actuator via at least one pump.

The control device may in particular have a lowering brake mode in which the boom can be lowered and/or luffed and/or retracted in a braked manner, wherein in the lowering brake mode the hydraulic actuator for adjusting the boom is motion-controlled, in particular speed-controlled, by means of the displacement controller. In particular, braking can be provided in this respect via an electric motor, with the pump then acting as the motor.

The at least one pump can be configured as a fixed displacement pump with a variable speed drive, for example in the form of an electric motor, so that the speed of the boom hydraulic actuator can be controlled by adjusting the speed of the drive motor of the pump.

Alternatively, the at least one pump can also be designed as a variable displacement pump in order to achieve speed control of the hydraulic actuator by adjusting the displacement volume of the pump. In this case, the pump can be driven at a constant speed, although a variable speed drive motor could also be provided.

In particular, the at least one pump can connected the two pressure chambers acting in opposite directions of the hydraulic actuator with each other to deliver pressure fluid from one pressure chamber to the other chamber acting in opposite direction, or in the reverse direction from the another chamber to the one chamber.

The hydraulic actuator can, for example, be configured as a synchronous cylinder in which the volume of the inflowing and outflowing hydraulic oil is always at least approximately the same. For example, such a synchronous cylinder can have a continuous piston rod or a piston rod on both sides of the piston so that the piston areas are the same on both sides.

Alternatively, or additionally, a differential cylinder with at least approximately identical area ratio or a pair of differential cylinders arranged in opposition can also be used as a boom hydraulic actuator in order to be able to perform displacement control in an uncomplicated manner with the at least one hydraulic pump. In principle, however, a pair of single-acting cylinders could also be provided.

In further development of the invention, however, a differential cylinder, which is conventional in itself, can also be used as a hydraulic actuator, in which the quantities of pressure fluid flowing in and out are in a certain ratio according to the piston area ratio. In order to compensate for the difference in volume that occurs when the pressurized fluid is circulated between the two pressure chambers of different sizes or also due to leakage, a second pump can be provided to compensate for the difference in volume that occurs. In particular, such a second pump can be connected to only one pressure chamber, for example, of the oppositely acting pressure chambers of the hydraulic actuator and, on the other hand, be connected to the tank of the system in order to supply the additionally required volume from the tank in the adjustment direction and to return the excess displaced volume into the tank in a controlled manner.

For example, such a second pump may be connected to the pressure chamber, which undergoes a volume reduction when the boom is lowered and/or luffed and/or retracted. For example, such a second pump may be connected to the connecting line connecting the first pump to the pressure chamber of the hydraulic actuator that lobs or telescopes the boom.

However, the at least one pump does not necessarily have to be connected to both pressure chambers acting in opposite directions. In further development of the invention, the at least one pump can also be connected to only one connection of the hydraulic actuator and, on the other hand, to the tank of the system, whereas the pump can be connected in particular to the connection of the pressure chamber that raises the boom or is reduced in volume during lowering.

In particular, a first pump may be connected to a first port of the hydraulic actuator and to the tank, and another pump may be connected to the second, opposing port of the hydraulic actuator and also to the tank, so that by operating the pumps in opposite directions, pressure fluid may be supplied to one pressure chamber and discharged from the other pressure chamber, whereas by reversing the supply directions of the two pumps, an opposing boom movement may be displacement-controlled.

According to a further embodiment, the system can also operate with a hydraulic pressure accumulator to compensate for a volume difference occurring during adjustment of the hydraulic actuator or to temporarily store displaced volume. In particular, the at least one pump can be connected to the two hydraulic ports acting in opposite directions of the hydraulic actuator in order to deliver pressure fluid back and forth between the two pressure chambers acting in opposite directions in the manner already described. In order to be able to receive and temporarily store an oscillating volume occurring during the feeding back and forth, for example when using a differential cylinder, a hydraulic pressure accumulator can receive the excess volume, so to speak, which is displaced from the pressure chamber with the larger cross-section during an adjusting movement of the hydraulic actuator and does not fit into the smaller chamber to be filled. For example, such a hydraulic accumulator may be connected to the low-pressure side of the boom hydraulic actuator and may preload the low-pressure side.

In furtherance of the invention, in order to make the displacement control system insensitive to variations in displacement volume and to have no unwanted system pressure changes due to tolerances and inaccuracies, a flushing arrangement and/or a feeding arrangement may be provided that can flush back too much displaced volume into the tank and/or feed missing volume into the displacement control system.

In practice, deviations in the displacement volume of the one or two pumps may occur, for example, due to a limited control quality of the variable displacement pumps or a tolerance-related gradation of the fixed displacement pumps, as a result of which the quantity of pressure fluid supplied does not correspond to the exact area ratio of the pressure chambers of the actuator. Such deviations of the volume displaced by the at least one pump from the area ratio of the pressure chambers of the actuator would in itself lead to an undesired pressure increase up to pressure limitation or, conversely, to a pressure drop up to cavitation in the system. Such unwanted pressure increases, and pressure drops can be prevented by the flushing arrangement and/or feeding arrangement.

The flushing arrangement and/or feeding arrangement may in particular comprise at least one feed pump by means of which any missing volume occurring in the displacement controller can be replaced, i.e. a corresponding quantity of pressure fluid can be fed in on the side of the displacement controller on which the volume is missing.

Advantageously, such a feed pump can be connected to the low-pressure side of the hydraulic actuator to feed a respective oil quantity to the low-pressure side. The low-pressure side of the boom hydraulic actuator can be the pressure chamber, which experiences a reduction in volume when the boom is raised or luffed up or extended.

In further development of the invention, the flushing arrangement and/or feeding arrangement may also have at least one flushing valve through which a constant oil volume flow may be withdrawn from the displacement control system and returned to the tank, such flushing valve advantageously being provided on the low pressure side of the hydraulic actuator to withdraw from the low pressure side the pressure fluid flow. The quantity of pressure fluid derived from the flushing valve can be replaced continuously or cyclically by the feed pump.

Alternatively, or in addition to such a flushing valve, the feed arrangement and/or flushing arrangement may also comprise a pressure limiting valve through which pressure fluid supplied by the feed pump can be supplied directly into the tank. This allows a certain pressure level to be established on the system side into which the feed pump feeds and/or prevents excessive pressure.

Advantageously, the feed pump can be controlled to automatically compensate for deviations in the volume flow ratio of the two the main pumps by having the feed pump feed more or less pressure fluid.

Advantageously, the feed pump can be connected to both pressure chambers of the hydraulic actuator via check valves or directional valves so that pressure fluid can be fed to the low-pressure side even when the low pressure and high-pressure sides change.

Alternatively or in addition to such a feed pump, the flushing arrangement and/or the feeding arrangement can also comprise a pressure accumulator which can receive an excess of the circulated pressure fluid on one of the pressure sides when the hydraulic actuator is adjusted or, conversely, can replenish or feedback a corresponding quantity of pressure fluid in the event of a shortage resulting from the adjustment.

In order to prevent unintentional lowering or retracting the boom as a result of a leakage of the at least one pump, at least one check valves can be assigned to the hydraulic actuator in order to shut off the outflow side pressurized under the weight of the boom or, if necessary, also the inflow side, thereby preventing actuator movement. Hydraulic pumps are usually not leak-free, so if the hydraulic actuator is pressurized, a slow downward movement could occur even if the pump stops or the displacement volume is swung to zero, but this can be prevented by the check valve.

Advantageously, two check valves can be provided to shut off the two pressure chambers acting in the opposite direction of the hydraulic actuator, and thus prevent unwanted actuator movement.

Advantageously, the check valves specified can be hydraulically operated under pilot control and/or opened and closed in a defined manner. Advantageously, the level of pilot pressure can be limited, for example, by a pressure limiting valve. This can ensure that the maximum permissible pressures in the hydraulic actuator are not exceeded.

Figure 2:
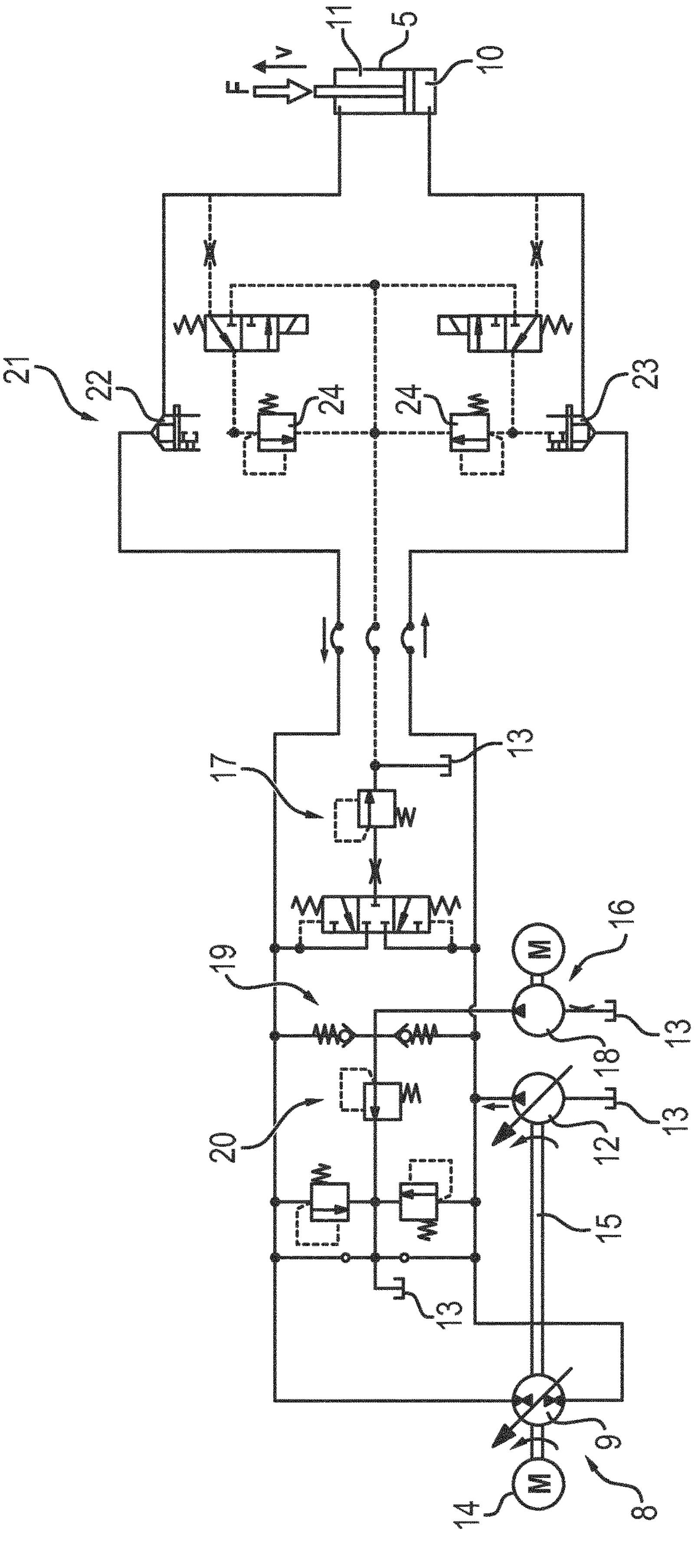
Figure 3:
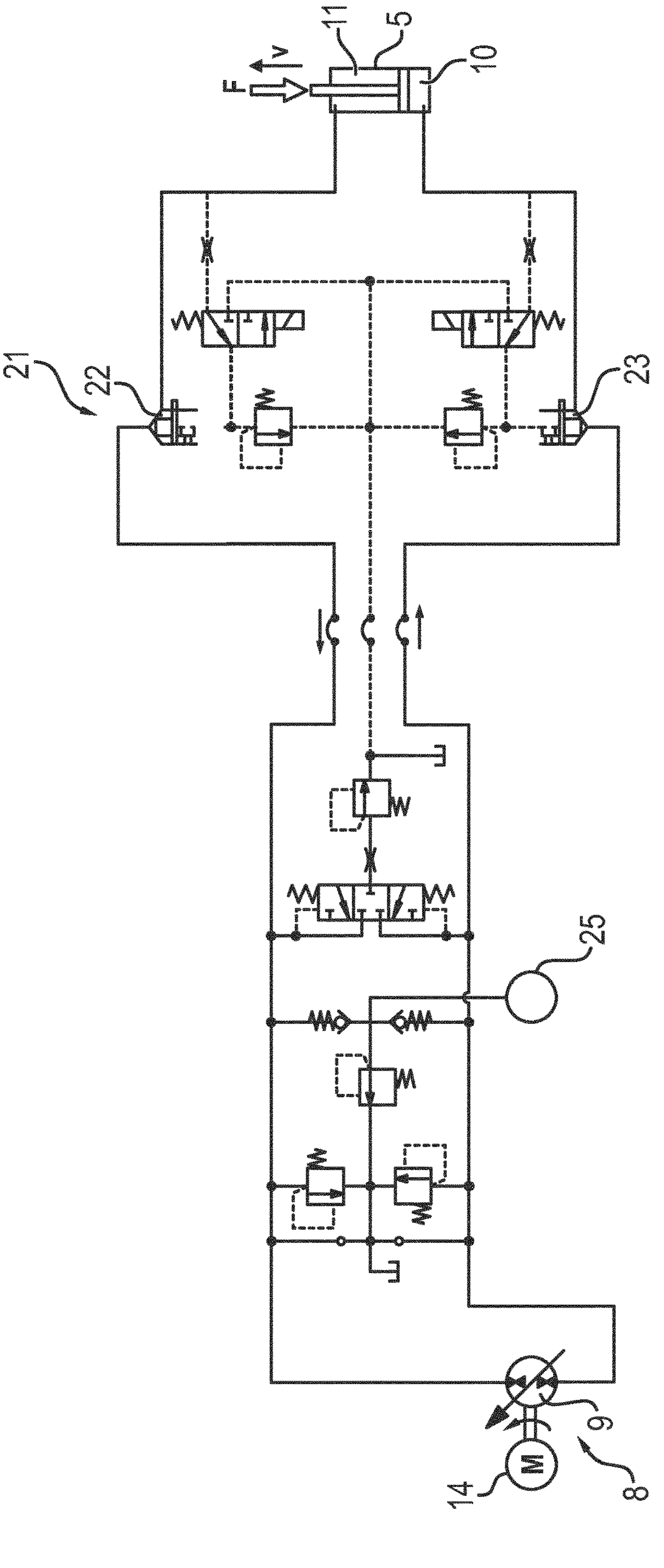

The invention will be explained in more detail in the following with respect to preferred embodiments and to associated drawings. The drawings show:

FIG. 1: a side view of a revolving tower crane with a luffing boom that can be luffed up and down by a hydraulic actuator;

FIG. 2: a circuit diagram of the hydraulic system for actuating the hydraulic actuator with a displacement controller comprising two main pumps and a feed pump, and FIG. 3: a circuit diagram of an alternative hydraulic system for displacement control of the hydraulic actuator, in which only one pump is provided, and a pressure accumulator compensates the oscillating volume.

As FIG. 1 shows, the lifting gear 1 can be configured as a tower revolving crane in the form of a so-called luffer, which comprises a boom 2 that is mounted on a tower 3 so that it can be luffed up and down. In this respect, the boom 3 can carry a ballast weight 4 on a counter boom portion.

Regardless thereof, the boom 2 can be luffed up and down by a hydraulic actuator 5, wherein the hydraulic actuator 5 can advantageously be configured as a hydraulic cylinder. It should be understood that more than one hydraulic actuator 5 can also be provided to be able to adjust the boom 2, for example in the form of a pair of double hydraulic cylinders. Regardless thereof, the hydraulic actuator 5 can be articulated on the tower 3 on the one hand and on the boom 2 on the other hand in order to be able to luff the boom 2 up and down relative to the tower about the horizontal luffing axis 6.

In this respect, the hydraulic actuator 5 is controlled by a control device 7, which, considered as a whole, may comprise hydraulic control components for controlling the pressure fluid flow and electrical or electronic control components for controlling the hydraulic components.

The control device 7 may, for example, comprise input means on a control station or remote control to be able to input an adjustment request for adjusting the boom 2, the input means may, for example, comprise a joystick or slide switch or a touch screen or other control command input means. The crane operator's input request is converted into control commands that adjust the hydraulic actuator 5 in order to adjust boom 2 according to the crane operator's request.

As FIG. 2 shows, the control device 7 comprises a displacement controller to move the hydraulic actuator 5 in a displacement-controlled manner.

The displacement controller 8 comprises at least a first pump 9, which connects the two pressure chambers 10 and 11 of the hydraulic actuator 5 acting in the opposite direction with each other and circulates pressure fluid from one pressure chamber 10 into the other pressure chamber 11 or vice versa from the pressure chamber 11 into the pressure chamber 10, thereby actuating the hydraulic actuator 5 in a displacement-controlled manner. Depending on the direction in which the displacement volume is circulated, the hydraulic cylinder extends or retracts.

As FIG. 2 shows, the displacement controller 8 may comprise a second pump 12 connected to one of the pressure chambers 10 and, on the other hand, to the tank 13 in order to discharge the pressure fluid from the chamber 10 into the tank 13 or, conversely, to supply the pressure medium from the tank into the pressure chamber 10. By means of the second pump 12, the quantity of pressure fluid caused by the piston rod of the hydraulic actuator 5 or, in general, its differential volume, which occurs due to the difference in cross-section of the pressure chamber 10 and 11 when the hydraulic actuator 5 is adjusted, can be replaced or discharged.

As FIG. 2 shows, the second pump 12 can advantageously be connected to the piston side or the larger pressure chamber 10 to supply additional pressure fluid on the piston side when the piston rod is to be extended.

Advantageously, the first pump 9 is configured to be resistant to high pressure on both sides. In the case of the second pump 12, it is sufficient if only one side or one of the two hydraulic working ports is configured to be resistant to high pressure, since the other hydraulic working port communicates only with the tank 13.

The two the pumps 9 and 12 can be configured as fixed displacement pumps with a variable speed drive, wherein advantageously a common pump drive 14 can be provided for both pumps 9 and 12 in order to drive the pumps 9 and 10 synchronously at the same speed or in a fixed speed ratio to each other. This also allows torque compensation via the shaft, which can reduce the drive torque.

Alternatively, each pump 9 and 12 can also have its own drive, for example in the form of a variable-speed controllable electric motor, wherein a synchronizing stage 15 can be provided, if necessary, in order to coordinate the speeds and thus the delivery rates of the pumps.

Advantageously, the two pumps 9 and 12 have displacement volumes the ratio of which corresponds at least approximately to the cross-sectional area ratio of the pressure chambers 10 and 11, acting in the opposite direction, of the hydraulic actuator 5.

As an alternative to fixed displacement pumps with variable speed drive, however, variable displacement pumps 9 and 12 can also be provided, the displacement volume of which is adjustable. Here, too, a synchronization stage can be provided which then adjusts the displacement volume synchronously or in a fixed ratio to one another. Such variable displacement pumps can then be operated with a constant speed drive, if necessary, although variable speed drives can also be provided for variable displacement pumps, if necessary.

As FIG. 2 further shows, a flushing arrangement and/or a feeding arrangement 16 can be provided to flush excess circulation accumulating during displacement control into the tank or to feed circulation shortages. In practice, there may be deviations in the displacement volume, for example due to the limited control quality of the variable displacement pumps or tolerances in the grading of the fixed displacement pumps, so that this does not correspond exactly to the cross-sectional area ratio of the pressure chambers 10 and 11. As a result, the quantity of the pressure fluid circulated back and forth between pressure chambers 10 and 11 does not correspond to the exact area ratio of the pressure chambers 10 and 11. As a result, a pressure increase, which can build up to a pressure limit, or a pressure drop, which can lead to cavitation, would occur in itself.

However, these undesirable consequences can be avoided by the flushing arrangement and/or feeding arrangement 16.

The flushing arrangement and/or feeding arrangement 16 can on the one hand comprise a flushing valve 17, via which advantageously an oil volume flow, in particular a constant oil volume flow, can be taken from the low-pressure side of the hydraulic circuit with which the hydraulic actuator 5 is operated and fed back into the tank, cf. FIG. 2. Here, cooling and/or filtering of the pressure medium fed back can take place and a corresponding cooling and/or filtering device can be provided.

The flushing arrangement and/or the feeding arrangement 16 may further comprise at least one feed pump 18, which may replace the oil quantity returning to the tank via the flushing valve 17. Regardless thereof, the feed pump 18 can also compensate for deviations in the volume flow ratio of the two the pumps 9 and 12, in that the feed pump 18 occasionally feeds in more or less pressure medium.

The feed pump 18 can advantageously feed pressure medium to the low pressure side of the hydraulic circuit, wherein, if necessary, via a valve arrangement 19, which can comprise, for example, check valves or directional valves, a feed can always be made to the low pressure side, irrespective of the direction in which the hydraulic actuator 5 is actuated or which side is the low pressure side.

In further development of the invention, the feed pump 18 can supply fluid to a pressure limiting valve 20, or pressure fluid supplied by the feed pump 18 can be supplied directly into the tank through the pressure limiting valve 20 after the corresponding pressure level is reached.

Since hydraulic pumps are generally not leak-free, a slow downward movement of the boom 12 can occur even when the pumps 9 and 12 are stopped or swiveled to the zero position, since the hydraulic actuator 5 is under corresponding pressure due to the weight of the boom 2.

In order to avoid such an unwanted downward movement as a result of a pump leakage, a check valve arrangement 21 can be provided by means of which the outflows and/or inflows of the hydraulic actuator 5 can be shut off. Such a check valve arrangement 21 may be provided, in particular, between the pumps 9 and 12 and the hydraulic actuator 5.

As FIG. 2 shows, the check valve arrangement 21 can advantageously comprise two check valves 22, 23 which can be opened and closed in a defined manner to hydraulically lock the hydraulic actuator 5.

The check valves 22, 23 may be hydraulically operated under pilot control, and the level of pilot pressure may be limited by a pressure limiting valve 24. This can ensure that the maximum permissible pressures in the hydraulic cylinder are not exceeded. In particular, the pilot pressure for the check valves 22, 23 can be limited by the pressure limiting valve 24 in such a way that the respective check valve 22 or 23 opens as soon as a critical or predetermined maximum pressure is reached in the hydraulic actuator 5.

As FIG. 3 shows, the displacement control system does not necessarily need several pumps as is the case with the design according to FIG. 2. In particular, the second pump 12 and the feed pump 18 can be dispensed with, wherein advantageously a hydraulic accumulator 25 can be provided, which can accommodate the oscillating volume of the hydraulic actuator 5, which can be configured as a differential cylinder, and advantageously hydraulically preload the low-pressure side of the hydraulic system.

If necessary, however, only the second pump 12 can be dispensed with, in particular if a synchronous cylinder is used as the hydraulic actuator 5 or a pair of differential cylinders arranged in opposite directions are used, so that the oscillating volume is at least approximately zero. In this case, the flushing arrangement and/or the feeding arrangement 16, in particular its flushing valve 17 and its feed pump 18, can suffice for the volume flow compensation that may still occur.

Other than shown in FIG. 2, a different connection or wiring of the two the pumps 9 and 12 can also be provided. For example, the first pump 9 may be connected to the pressure chamber of the hydraulic actuator 5 and the tank on one side, while the second pump 12 may be connected to the pressure chamber 11 of the hydraulic actuator 5 and the tank on the other side.

The displacement controller 8 can be used to adjust the boom 2, in particular, as follows: If a crane operator enters an adjustment request via the input device of the control device 7, in particular a desired speed for an up luffing or a down luffing of the boom 2, the control device 7 controls the at least one pump 9 in order to circulate a corresponding pressure medium volume. If first and second pumps 9 and 12 are provided, as shown in FIG. 2, the control device 7 controls both pumps 9 and 12 to produce a corresponding flow rate of both pumps. For this purpose, the control device 7 can directly adjust or control the swivel angle of the two pumps 9 and 12 or, in the case of fixed displacement pumps, adjust the speed of the drive shaft or the common pump drive 14 so that the desired volume flow is generated.

The speed of the hydraulic actuator 5 is proportional to the volume flow circulated by the two pumps 9 and 12. Due to the immediate adjustment and the omission of pressure-dependent controls such as a lowering brake, a fast response and precise control of the adjustment movement of the boom 2 can be achieved without any tendency to vibrate. At the same time, the system is characterized by higher energy efficiency, as in regard to the previous brake valve controls, losses at volume flow control valve edges are eliminated. This makes it possible to reduce the connected or drive power or to increase the travelable adjustment speeds of the boom 2. Furthermore, the general pressure level in the system can also be lowered, which reduces the demands on the components.

The invention claimed is:

1. A lifting gear comprising:

a boom;

a boom adjustment unit comprising at least one hydraulic actuator for adjusting the boom; and a control device for controlling the movement of the hydraulic actuator, the control device being provided with a displacement controller having a first pump for adjusting the hydraulic actuator;

wherein:

the first pump connects two pressure chambers acting in opposite directions of the hydraulic actuator with each other and circulates pressure medium from one pressure chamber into the other pressure chamber; and the hydraulic actuator comprises a synchronous cylinder with equal pressure chamber cross-sectional areas or has a pair of differential cylinders arranged in opposition, the oscillating volumes of which at least approximately compensate each other.

2. The lifting gear according to claim 1, wherein the boom adjustment unit is free of throttle valves and brake valves, and speed-controlled.

3. The lifting gear according to claim 1, wherein:

the control device comprises a lowering brake mode; and in the lowering brake mode, the hydraulic actuator is motion-controlled by means of the displacement controller.

4. The lifting gear according to claim 1, wherein:

the displacement controller further has a second pump connected on the one hand to one of the pressure chambers and on the other hand to a tank; and the first and second pumps have displacement volumes whose ratio corresponds at least approximately to the cross-sectional area ratio of the pressure chambers of the hydraulic actuator.

5. The lifting gear according to claim 1, wherein the first pump is configured as a pump selected from the group consisting of a fixed displacement pump with a variable speed drive and a variable displacement pump with an adjustable displacement volume.

6. The lifting gear according to claim 1 further comprising:

a flushing arrangement and/or a feeding arrangement for compensating for excess quantities and/or sub-quantities occurring during circulation of the pressure medium between the pressure chambers acting in opposite directions of the hydraulic actuator.

7. The lifting gear according to claim 6, wherein the flushing arrangement and/or the feeding arrangement comprises a flushing valve for flushing excess quantities of the pressure medium occurring during displacement control of the hydraulic actuator into a tank.

8. The lifting gear according to claim 7, wherein the flushing valve flushes the pressure medium into the tank on a low-pressure side of the hydraulic actuator.

9. The lifting gear according to claim 6, wherein the flushing arrangement and/or the feeding arrangement comprises a feed pump for feeding sub-quantities of the pressure medium occurring during displacement control of the hydraulic actuator.

10. The lifting gear according to claim 9, wherein the feed pump feeds the pressure medium on a low-pressure side of the hydraulic actuator.

11. The lifting gear according to claim 1 further comprising:

a check valve arrangement between the first pump and the hydraulic actuator for shutting off inflows and/or outflows of the hydraulic actuator and thus locking the hydraulic actuator.

12. The lifting gear according to claim 11, wherein the check valve arrangement comprises two check valves provided for shutting off the inflows and outflows of the hydraulic actuator.

13. A lifting gear comprising:

a boom;

a boom adjustment unit comprising at least one hydraulic actuator for adjusting the boom; and a control device for controlling the movement of the hydraulic actuator, the control device being provided with a displacement controller having a first pump and a second pump for adjusting the hydraulic actuator; and wherein:

the hydraulic actuator comprises a synchronous cylinder with equal pressure chamber cross-sectional areas or has a pair of differential cylinders arranged in opposition, the oscillating volumes of which at least approximately compensate each other;

the first pump is connected to a pressure chamber of the hydraulic actuator acting in one direction and to a tank;

the second pump is connected to another pressure chamber of the hydraulic actuator acting in the opposite direction and to the tank; and the first and second pumps have displacement volumes whose ratio corresponds at least approximately to the cross-sectional area ratio of the pressure chambers of the hydraulic actuator.

14. A lifting gear, comprising:

a boom;

a boom adjustment unit comprising at least one hydraulic actuator for adjusting the boom; and a control device for controlling the movement of the hydraulic actuator, the control device being provided with a displacement controller having a first pump and a second pump for adjusting the hydraulic actuator;

wherein:

the first pump connects two pressure chambers acting in opposite directions of the hydraulic actuator with each other and circulates pressure medium from one pressure chamber into the other pressure chamber;

the second pump is connected on the one hand to one of the pressure chambers and on the other hand to a tank;

the first and second pumps have displacement volumes whose ratio corresponds at least approximately to the cross-sectional area ratio of the pressure chambers of the hydraulic actuator; and a synchronization stage is provided for synchronizing the drive speed or synchronizing the displacement volume adjustment between the first and second pumps.

15. A lifting gear comprising:

a boom;

a boom adjustment unit comprising at least one hydraulic actuator for adjusting the boom;

a control device for controlling the movement of the hydraulic actuator, the control device being provided with a displacement controller having a first pump for adjusting the hydraulic actuator; and a flushing arrangement and/or a feeding arrangement for compensating for excess quantities and/or sub-quantities occurring during circulation of pressure medium between pressure chambers acting in opposite directions of the hydraulic actuator;

wherein:

the flushing arrangement and/or the feeding arrangement comprises a feed pump for feeding sub-quantities of the pressure medium occurring during displacement control of the hydraulic actuator; and a hydraulic circuit portion into which the feed pump feeds the pressure medium is connected to a tank via a pressure limiting valve.

16. A lifting gear comprising:

a boom;

a boom adjustment unit comprising at least one hydraulic actuator for adjusting the boom;

a control device for controlling the movement of the hydraulic actuator, the control device being provided with a displacement controller having a first pump for adjusting the hydraulic actuator; and a check valve arrangement between the first pump and the hydraulic actuator for shutting off inflows and/or outflows of the hydraulic actuator and thus locking the hydraulic actuator;

wherein;

the check valve arrangement comprises two check valves provided for shutting off the inflows and outflows of the hydraulic actuator;

the check valves are hydraulically operated under pilot control; and a pilot pressure of the check valves is limited by a pressure limiting valve in such a way that when a predetermined pressure is reached in the hydraulic actuator, the pilot pressure is frozen and/or limited.

* * * * *